US008373326B2

(12) United States Patent
Enomoto et al.

(10) Patent No.: US 8,373,326 B2
(45) Date of Patent: Feb. 12, 2013

(54) AXIAL GAP MOTOR, COMPRESSOR, MOTOR SYSTEM, AND POWER GENERATOR

(75) Inventors: Yuji Enomoto, Hitachi (JP); Zhuonan Wang, Hitachi (JP); Ryoso Masaki, Narashino (JP); Hiromitsu Itabashi, Tottori (JP); Kazumasa Ide, Hitachiota (JP)

(73) Assignees: Hitachi Metals, Ltd., Tokyo (JP); Hitachi Appliances, Inc., Tokyo (JP)

( * ) Notice: Subject to any disclaimer, the term of this patent is extended or adjusted under 35 U.S.C. 154(b) by 84 days.

(21) Appl. No.: 12/909,872

(22) Filed: Oct. 22, 2010

(65) Prior Publication Data

US 2011/0095628 A1 Apr. 28, 2011

(30) Foreign Application Priority Data

Oct. 22, 2009 (JP) ................. 2009-243237

(51) Int. Cl.
*H02K 1/06* (2006.01)
*H02K 21/12* (2006.01)

(52) U.S. Cl. ... 310/216.045; 310/216.044; 310/216.046; 310/216.048; 310/156.32

(58) Field of Classification Search ............ 310/156.32–156.37, 268, 44, 154.33, 154.46, 156.33, 310/156.48, 216; *H02K 21/12, 21/14, 21/16, H02K 21/18, 21/22, 21/24*
See application file for complete search history.

(56) References Cited

U.S. PATENT DOCUMENTS

| | | | | |
|---|---|---|---|---|
| 4,187,441 A | * | 2/1980 | Oney | 310/112 |
| 4,255,684 A | * | 3/1981 | Mischler et al. | 310/216.031 |
| 5,134,771 A | * | 8/1992 | Lee et al. | 29/609 |
| 5,731,649 A | * | 3/1998 | Caamano | 310/216.047 |
| 6,472,792 B1 | * | 10/2002 | Jack et al. | 310/216.066 |

(Continued)

FOREIGN PATENT DOCUMENTS

| | | |
|---|---|---|
| CN | 1641978 A | 7/2005 |
| JP | 2005-287212 | 10/2005 |

(Continued)

OTHER PUBLICATIONS

JPO Machine Translation, JP 2008245504, Manufacturing Method of Armature Core, and Armature Core, Apr. 18, 2012, http://dossier.ipdl.inpit.go.jp/text_trans.html.*

(Continued)

*Primary Examiner* — Quyen Leung
*Assistant Examiner* — Thomas Truong
(74) *Attorney, Agent, or Firm* — Antonelli, Terry, Stout & Kraus, LLP.

(57) ABSTRACT

An axial gap motor includes a stator having stator teeth, and also includes a rotor opposed to the stator with a gap in an axial direction of the stator. Each of the stator teeth includes a stator tooth body, a stator tooth end joined to at least one axial-direction end of the stator tooth body, and a stator coil disposed around the stator tooth body. The stator tooth body includes a wound core comprised of a multi-layered amorphous foil strip winding. The stator tooth end is formed by a compact including a powder magnetic core, and the stator tooth end includes a surface opposed to the rotor. A cross-sectional area of the stator tooth end perpendicular to an axis of the amorphous foil strip winding is larger than a cross-sectional area of the stator tooth body perpendicular to the axis of the amorphous foil strip winding.

14 Claims, 14 Drawing Sheets

U.S. PATENT DOCUMENTS

| | | | |
|---|---|---|---|
| 7,135,800 B2 | 11/2006 | Yamada et al. | |
| 8,058,762 B2 * | 11/2011 | Asano | 310/156.33 |
| 2006/0082241 A1 * | 4/2006 | Enomoto et al. | 310/216 |

FOREIGN PATENT DOCUMENTS

| | | | |
|---|---|---|---|
| JP | 2008245504 A | * | 10/2008 |
| WO | WO 2006077812 A1 | * | 7/2006 |

OTHER PUBLICATIONS

Chinese Office Action dated Dec. 14, 2012 for Application No. 201010515614.5.

* cited by examiner

AXIAL GAP MOTOR, COMPRESSOR, MOTOR SYSTEM, AND POWER GENERATOR

CLAIM OF PRIORITY

The present application claims priority from Japanese Patent Application JP 2009-243237 filed on Oct. 22, 2009, the content of which is hereby incorporated by reference into this application.

FIELD OF THE INVENTION

The present invention relates to an axial gap motor having gap in axial direction, and more particularly to the stator structure of the axial gap motor. The present invention also relates to an electromagnetic product that includes the axial gap motor.

BACKGROUND OF THE INVENTION

In recent years, it has become important that, for example, industrial devices, home electrical appliances, and automotive parts provide increased energy savings. Electrical power currently generated at domestic power stations such as thermal power stations, hydroelectric power stations, nuclear power stations, or wind power stations is mostly generated with a rotary electric machine (power generator). Further, more than half the amount of domestically used electrical power is consumed to drive rotary electric machines. These electromagnetic products use an iron core made of a soft magnetic material. Enhanced efficiency can be achieved by reducing the loss of the iron core. Moreover, it is demanded that the electromagnetic products also achieve cost reduction in addition to efficiency enhancement.

The rotary electric machines basically include, for instance, an iron core made of a soft magnetic material, a coil, and a permanent magnet. The loss of the rotary electric machines can be roughly divided into iron loss and copper loss. The iron loss is determined by the characteristics of the soft magnetic material. The copper loss is determined by the resistance value of the coil, that is, the packing factor of the coil, and can be reduced by making the structure of a winding compact. Efficiency enhancement can be achieved by designing, for instance, the shape and dimensions of the rotary electric machines in such a manner as to reduce the aforementioned losses. However, the characteristics of the material can be changed with a view toward efficiency enhancement.

Amorphous alloys have top-ranking low iron loss characteristics among the soft magnetic materials. However, the amorphous alloys are manufactured by forming an amorphous body through rapid cooling. Therefore, the amorphous alloys can only be manufactured in the form of a thin foil strip (ribbon-shaped). This makes it difficult to form the amorphous alloys as an iron core. Consequently, the amorphous alloys have not been used for the aforementioned electromagnetic products.

The amorphous alloys can be used, for instance, as a wound core. As the wound core can be configured simply by winding a foil strip, it is possible to compensate for amorphous alloys' disadvantages such as poor workability, thinness, and unhandiness. If the wound core is used as is for a motor without being cut for segmentation, it is suitable for a configuration such as an axial gap motor (axial gap rotary electric machine).

A basic structure of the axial gap rotary electric machine is described, for instance, in Japanese Unexamined Patent Application Publication No. 2005-287212. This structure includes a teeth portion and a yoke portion, and has only one opposed surface that is oriented in axial direction to contribute toward torque output. Further, as this structure causes magnetic flux to flow from the teeth portion to the yoke portion, it is necessary to use a soft magnetic material in consideration of a three-dimensional magnetic flux flow. To meet these requirements, it is necessary to use a powder magnetic core or other material whose magnetic properties exhibit three-dimensional isotropy. However, these materials have lower magnetic permeability than a commonly used silicon steel sheet, and suffer from significant iron loss. Therefore, the use of these materials makes it difficult to reduce the size of the axial gap rotary electric machine.

The above problem can be addressed by the use of a technology that forms an amorphous iron core with two opposed surfaces oriented in axial direction. However, this technology needs further improvement. More specifically, magnetic flux obtained from the surfaces of opposing magnets separated by a gap cannot be effectively attracted to the core because the core's cross-sectional area in a plane perpendicular to a winding axis remains constant in any axial cross section. Further, if a large coil winding space is used, a coil region becomes enlarged to increase the inter-teeth distance. This increases torque pulsation and changes the waveform of induced voltage from a sine wave to a substantially rectangular wave. It means that the coil winding space is limited to reduce the degree of freedom in design.

The present invention provides an axial gap motor that, allowing an iron core to effectively attract magnetic flux obtained from opposing magnets separated by a gap, addresses the above-described problem with the related art by decreasing torque pulsation and keeping induced voltage in the shape of a sine wave, and increases the degree of freedom in design. The present invention also provides a low-iron-loss (high-efficiency), low-cost axial gap motor and electromagnetic products in which a high-quality soft magnetic iron core is placed at an appropriate position.

SUMMARY OF THE INVENTION

To address the above-described problem, the axial gap motor according to the present invention basically provides the following features.

According to one aspect of the present invention, an axial gap motor includes a stator having stator teeth; and a rotor being opposed to the stator with a gap in an axial direction of the stator. Each of the stator teeth includes a stator tooth body, a stator tooth end joined to at least one axial-direction end of the stator tooth body, and a stator coil disposed around the stator tooth body. The stator tooth body includes a wound core comprised of a multi-layered amorphous foil strip winding. The stator tooth end is formed by a compact made of a powder magnetic core, and includes an opposed surface to the rotor. A cross-sectional area of the stator tooth end perpendicular to an axis of the amorphous foil strip winding is larger than a cross-sectional area of the stator tooth body perpendicular to the axis of the amorphous foil strip winding.

Preferably, the cross-sectional area of the stator tooth end increases from a joint to the stator tooth body toward the opposed surface.

In addition, the axial gap motor according to the present invention basically provides the following features.

According to another aspect of the present invention, an axial gap motor includes a stator having a stator tooth; and a rotor being opposed to the stator with a gap in the axial direction of the stator. Each of the stator teeth includes a stator tooth body, a stator tooth end joined to at least one axial-direction end of the stator tooth body, and a stator coil disposed around the stator tooth body. The stator tooth body is formed by a compact made of a powder magnetic core. The stator tooth end includes an opposed surface to the rotor. A portion of the stator tooth end including the opposed surface is formed by disposing a wound core comprised of a multi-layered amorphous foil strip winding. A portion of the stator tooth end joined to the stator tooth body is formed by a compact made of a powder magnetic core. A cross-sectional area of the stator tooth end perpendicular to an axis of the amorphous foil strip winding is larger than a cross-sectional area of the stator tooth body perpendicular to the axis of the amorphous foil strip winding.

Preferably, the cross-sectional area of the portion of the stator tooth end, the portion being formed by the compact made of the powder magnetic core, increases from a joint to the stator tooth body toward the opposed surface.

A compressor for an air conditioner, a motor system for driving an automobile, and a power generator for wind power generation according to the present invention include the above-described axial gap motor.

In the present invention, since a wound core (multilayer iron core) obtained by winding an amorphous alloy is used as a stator core, iron loss can be significantly decreased to simultaneously enhance the efficiency of a motor (rotary electric machine) and reduce the cost thereof.

Further, in the present invention, since high magnetic permeability properties of an amorphous alloy is effectively utilized, the performance of a rotary electric machine can be expected to improve. This makes it possible to decrease torque pulsation, keep induced voltage in the shape of a sine wave, and increase the degree of freedom in design although these could not be easily achieved by a conventional axial gap motor that uses an amorphous alloy. Consequently, high-performance and economical electromagnetic products can be provided at low cost.

DETAILED DESCRIPTION OF THE INVENTION

Figure 1A:
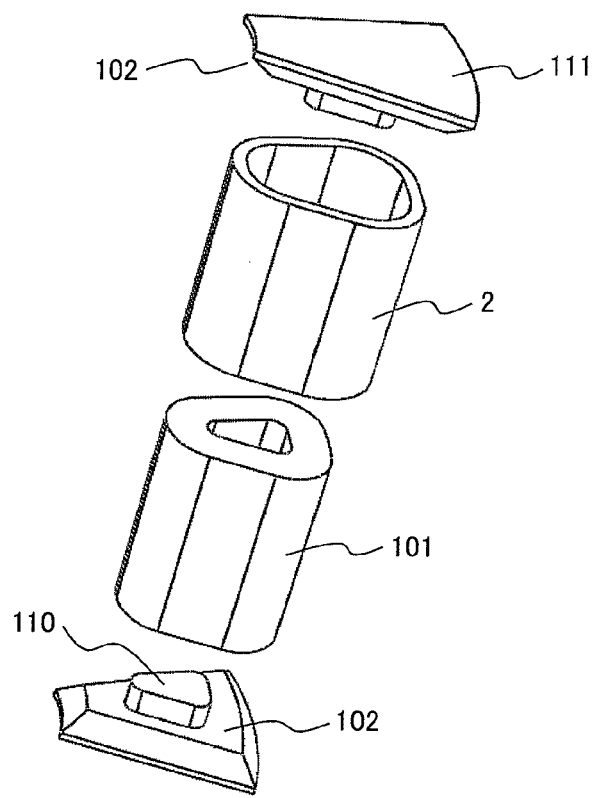
FIG. 1A is an exploded view illustrating the structure of a stator tooth of an axial gap motor according to a first embodiment of the present invention.

In an axial gap motor according to an embodiment of the present invention, a wound core obtained by winding a low-iron-loss amorphous foil strip is applied to stator teeth. The shape of the cross-sectional area of the wound amorphous iron core in a plane perpendicular to a winding axis remains the same in any cross section. Therefore, the wound amorphous iron core is applied to a portion of the stator teeth that has a constant cross-sectional shape in a plane perpendicular to the winding axis. A powder magnetic core is used to prepare a portion of the stator teeth that does not have a constant cross-sectional shape in the above-mentioned plane. The shape of the wound amorphous iron core is not limited to circular. For example, it may alternatively be substantially circular, or polygonal or oval. The amorphous foil strip is made of an iron-based or cobalt-based amorphous alloy.

In the subsequent explanation, it is assumed that the axial direction is a direction parallel to the winding axis of the wound amorphous iron core.

A stator core (an iron core portion of a stator tooth) includes a stator tooth body and a stator tooth end. The stator tooth body is a portion of a stator tooth around which a stator coil is disposed. The cross-sectional shape and area of the stator tooth body remain constant in a plane perpendicular to the axial direction of the iron core. The stator tooth end is disposed on either or both of upper and lower axial ends of the stator tooth body, and combined with the stator tooth body. The above-described wound core, which is obtained by winding an amorphous foil strip, is applied to the stator tooth body or stator tooth end.

When the stator core configured as described above is used as a stator of the axial gap motor, the stator tooth end opposes a rotor magnet. As regards the cross-sectional area in a plane perpendicular to the axial direction of the stator core, the present invention is configured so that the cross-sectional area of the stator tooth end is larger than the cross-sectional area of the stator tooth body. Therefore, the magnetic flux derived from opposing magnets separated by a gap can be effectively attracted to the iron core. This makes it possible to decrease torque pulsation and keep induced voltage in the shape of a sine wave. Further, even if a large coil winding space is used to enlarge a coil region, the magnetic flux derived from the magnets can be effectively attracted to the iron core because the cross-sectional area of the stator tooth end is large. This provides an increased degree of freedom in design. The shape of the stator tooth end will be described in detail later.

As the aforementioned stator tooth body, stator tooth end, and stator coil are combined to form a stator tooth of the axial gap motor, the present invention improves various motor characteristics, for instance, by decreasing torque pulsation, enhancing an induced voltage constant, and keeping induced voltage in the shape of a sine wave.

In the present invention, the wound core is formed by winding an amorphous foil strip. The wound core is used for a portion of the axial gap motor that has a constant cross-sectional shape in a plane perpendicular to the axial direction of the stator tooth body and stator tooth end. Preferably, the amorphous foil strip is wound with insulating resin sandwiched between the resulting amorphous foil strip layers to provide complete electrical insulation between the amorphous foil strip layers.

When, for instance, the stator tooth body is to be formed by a wound amorphous core, a powder magnetic core is used in such a manner the cross-sectional area of the stator tooth body in a plane perpendicular to the axial direction is lager than the stator tooth body's cross-sectional area. For an axial gap motor having a rotor on both sides, the stator tooth end is disposed on both ends of the stator tooth body to form a stator tooth. For an axial gap motor having a rotor on only one side, on the other hand, the stator tooth end is disposed on one end of the stator tooth body, and the other end is provided with an axial gap motor stator yoke, which is formed by a powder magnetic core and can be combined with the amorphous iron core of the stator tooth body, in order to form a stator.

Alternatively, it is possible to use a wound amorphous core to form a portion of the stator tooth end that has a constant cross-sectional shape, and use a powder magnetic core to form the stator tooth body and a portion of the stator tooth end that does not have a constant cross-sectional shape. In this instance, the stator tooth end, which is supposed to suffer from significant iron loss, is formed by an amorphous alloy, which suffers from extremely small iron loss. Therefore, motor efficiency can be greatly improved.

As the stator core configured as described above has a hybrid structure that includes an amorphous alloy and a powder magnetic core, a three-dimensional magnetic flux flow occurs to reduce the iron loss. This hybrid structure cannot easily be built with the other materials such as an electromagnetic steel sheet.

Embodiments of an axial gap motor, compressor, motor system, and power generator according to the present invention will be described below with reference to the accompanying drawings.

First Embodiment

An axial gap motor according to a first embodiment of the present invention will now be described with reference to FIGS. 1A to 4B.

Figure 1B:
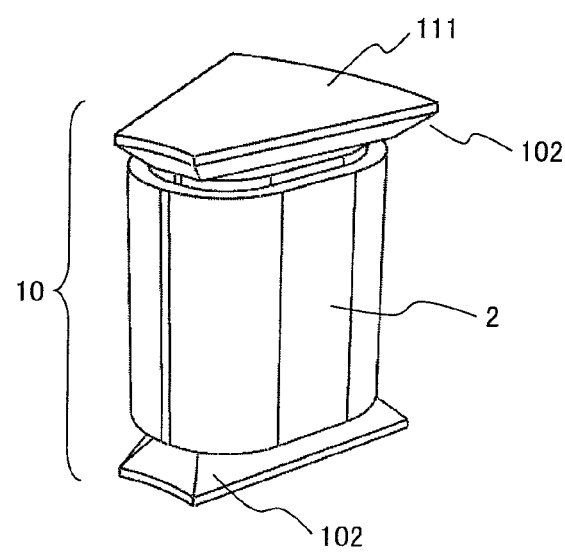
FIG. 1B is an assembly diagram illustrating the structure of a stator tooth of the axial gap motor according to the first embodiment of the present invention.

FIGS. 1A and 1B are diagrams illustrating the configuration of a stator tooth of the axial gap motor according to the first embodiment of the present invention. The stator tooth 10 includes a stator core and a stator coil 2, which is disposed around the stator core. The stator core includes a stator tooth body 101 and a stator tooth end 102, and is prepared by using a wound amorphous core and a compact made of a powder magnetic core. In the present embodiment, the stator tooth end 102 is disposed on both ends of the stator tooth body 101. Further, the present embodiment uses a wound amorphous core for the stator tooth body 101. As the wound amorphous core has a constant cross-sectional shape in a plane perpendicular to the winding axis, the stator tooth body 101 also has a constant cross-sectional shape and area in a plane perpendicular to the axial direction.

The amorphous foil strip has a thickness as small as 25 μm. This is because a thick material cannot be made as an amorphous alloy is manufactured by a rapid cooling method. For example, the iron-based amorphous alloy, which is used as a magnetic material, is manufactured by dropping molten iron onto a rapidly rotating roll, allowing the iron to cool down rapidly, and winding the resulting thin foil strip. One surface of the obtained amorphous foil strip is a mirror-like surface having very low roughness. The mirror-like surface is handled as a front surface to wind the amorphous foil strip into a predetermined shape while a packing factor is increased beginning with the innermost end. In this manner, the stator tooth body 101 made of the wound amorphous core is obtained.

Next, the stator coil 2 is disposed around the stator tooth body 101. The stator coil 2 can be disposed by winding a wire in advance and joining the resulting coil to the stator tooth body 101 or by directly winding a wire around the wound core of the stator tooth body 101. In reality, an effective method is to use a magnet wire covered with an insulating film as an electrical wire for the stator coil 2 and provide secondary insulation by performing a taping process or winding the wire around a plastic bobbin.

The stator tooth end 102 is formed with a compact that is obtained by subjecting a powder magnetic core to compression molding. As shown in FIGS. 1A and 1B, the stator tooth end 102 is shaped in such a manner that its cross-sectional area in a plane perpendicular to the axial direction of the stator tooth is larger, than the cross-sectional area of the stator tooth body 101, and that its size increases toward the axial end of the stator tooth 10.

The stator tooth end 102 includes a protrusion 110, which is a mating part for joining the stator tooth end 102 to the stator tooth body 101. When the stator tooth end 102 is to be attached to the stator tooth body 101, which includes a wound core made of an amorphous foil strip, the protrusion 110 is fitted into a dent that is a wind-starting hole for the wound core of the stator tooth body 101.

Further, the stator tooth end 102 includes an opposed-to-gap surface 111 at the axial end of the stator tooth. The opposed-to-gap surface 111 opposes the rotor. The opposed-to-gap surface 111 is a flat surface that preferably has as large a surface as possible. The opposed-to-gap surface 111 may have a three-dimensional structure that has a spherically curved surface.

The stator tooth end 102 is shaped in such a manner that its cross-sectional area in a plane perpendicular to the axial direction gradually increases from the joint to the stator tooth body 101 toward the opposed-to-gap surface 111. The joint between the stator tooth end 102 and the stator tooth body 101 may be shaped like a taper or fillet (bended shape with curvature).

Figure 1C:
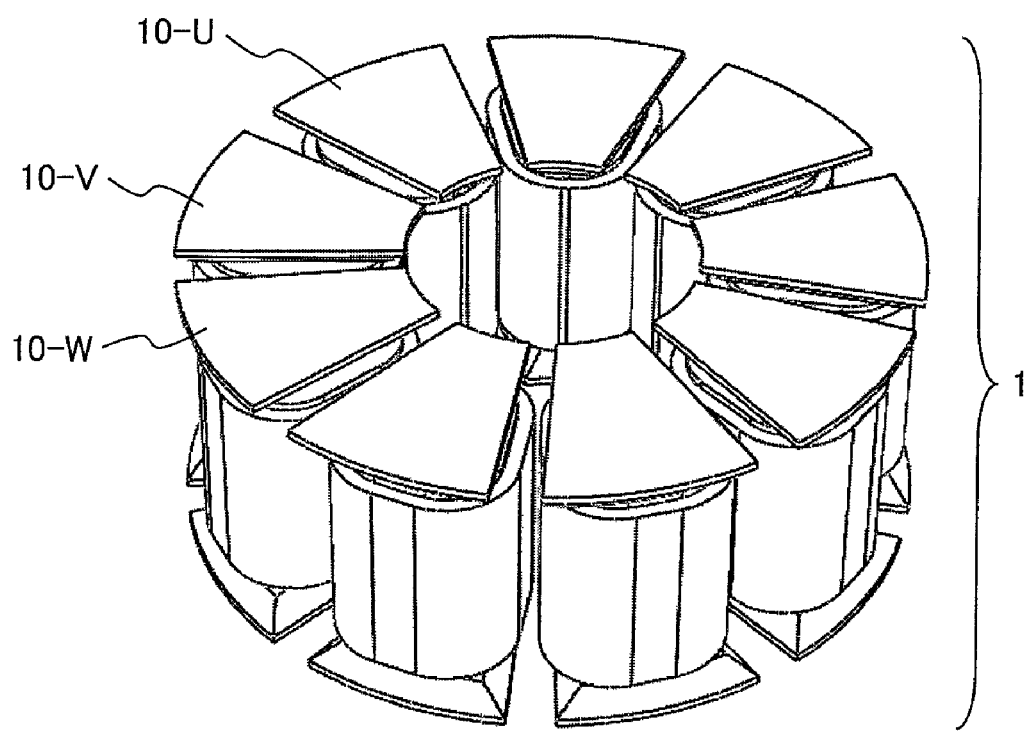
FIG. 1C is a diagram illustrating a stator of the axial gap motor according to the first embodiment of the present invention.

FIG. 1C shows an example of a stator, which is obtained by assembling a plurality of units of the stator tooth 10 shown in FIG. 1B. This example shows the stator 1 of a three-phase motor that is configured by circumferentially disposing nine units of the stator tooth 10, which each corresponds to one pole. In the example shown in FIG. 1C, a U-phase stator 10-U, a V-phase stator 10-V, and a W-phase stator 10-W are disposed at electrical angle intervals of 120 degrees.

Figure 2A:
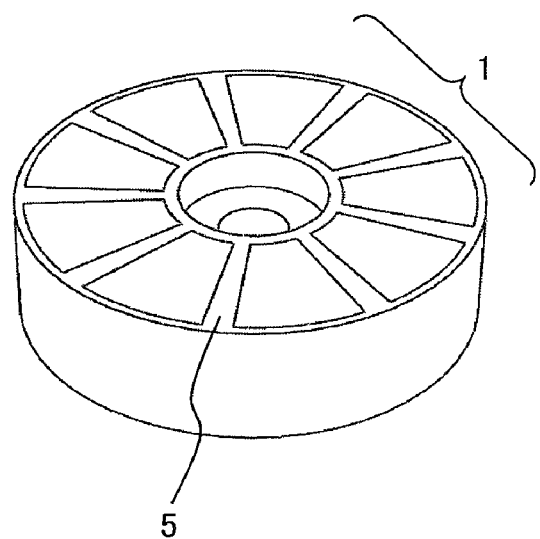
FIG. 2A is a diagram illustrating a structure for retaining and fixing the stator of the axial gap motor according to the first embodiment of the present invention with molding resin.
Figure 2B:
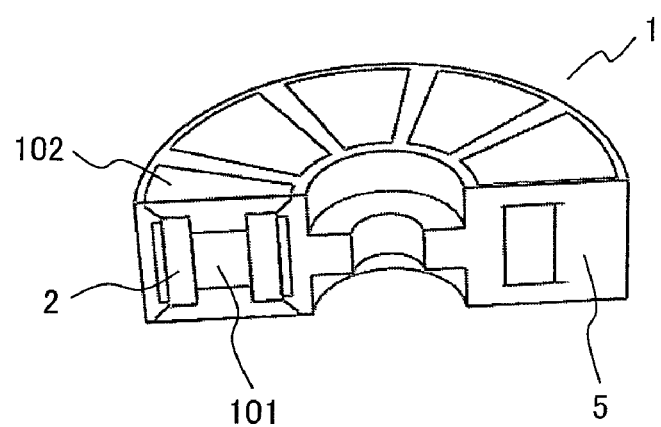
FIG. 2B is a cross-sectional view illustrating the structure for retaining and fixing the stator of the axial gap motor according to the first embodiment of the present invention with molding resin.

FIGS. 2A and 2B are diagrams illustrating the stator 1 that is retained and fixed with molding resin. FIG. 2A shows that the circumference of the stator 1 is covered with resin 5. With the stator 1 disposed as indicated in FIG. 1C and placed, for instance, in a mold, resin is injected into the mold by an injection molding method or the like to build the structure shown in FIG. 2A.

FIG. 2B is a cross-sectional view taken along a plane parallel to the axial direction of the stator 1 shown in FIG. 2A. The stator tooth body 101, stator tooth end 102, and stator coil 2 are configured as shown in FIG. 1B and disposed within the resin 5.

Any type of resin may be used as far as it is highly fluid. To obtain adequate strength through the use of a thermoplastic material, however, it is preferred that PPS (polyphenylene sulfide), PC (polycarbonate), PET (polyethylene telepathalate), POM (polyoxy methylene), PP (polypropylene), PEEK (polyetheretherketone), LCP (liquid crystal polymer), or other engineering plastic material be used. The strength can be increased by using a filler-incorporated resin although its fluidity might be inadequate. When thermosetting resin is to be used, it is preferred that epoxy resin, unsaturated polyester resin, or the like be selected. As these resins exhibit high fluidity, they can be impregnated into a 0.2 mm gap under low pressure. Further, heat transfer can be effectively improved by using resin containing silica or alumina.

Figure 3A:
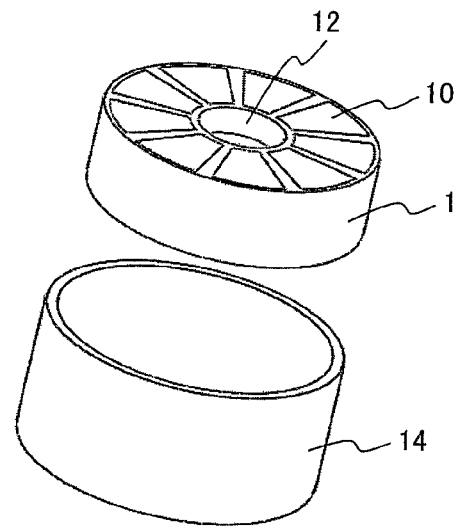
FIG. 3A is a diagram illustrating the structure of the stator of the axial gap motor according to the first embodiment of the present invention.
Figure 3B:
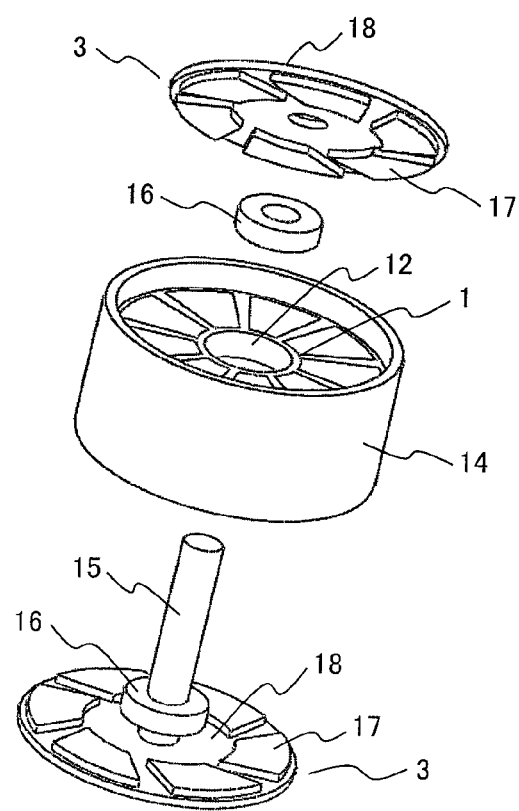
FIG. 3B is a diagram illustrating the structure of the axial gap motor according to the first embodiment of the present invention.

FIGS. 3A and 3B show an example configuration of the axial gap motor using a stator shown in FIG. 2A. The stator includes a hybrid iron core which includes an amorphous foil strip winding and a powder magnetic core compact. This example represents a structure in which the stator 1 shown in FIG. 2A is used for the stator teeth of the axial gap motor. In this instance, there are nine stator magnetic poles as mentioned earlier. Further, there are six magnet poles. In other words, the rotor 3 includes six magnets 17.

As shown in FIG. 3A, the stator 1 includes nine circumferentially disposed stator teeth 10. A bearing retainer 12, which is a member for retaining a bearing, is molded at the center of the stator 1. A housing 14 is disposed to surround the stator 1.

As shown in FIG. 3B, the rotor is configured so that six magnets 17 are mounted on one surface of a rotary disk 18 made of a magnetic material, disposed at equal spacing intervals with S and N poles arranged alternately, and fixed by gluing or other method. Two units of the rotor 3 are prepared. One unit of the rotor 3 is placed above the stator 1 and the other unit is placed below the stator 1. The disk 18 for one rotor is provided with a shaft 15, which is fixed to the center of the disk 18 by press-fitting, shrink-fitting, or gluing. A bearing 16 is positioned inside (around the center) of the surface to which the shaft 15 is fixed.

In FIGS. 3A and 3B, the bearing retainer 12 is integrated with a stator core retainer, which retains the stator core. In other words, the bearing retainer 12 doubles as the stator core retainer. The bearing 16 for the axial gap motor can be disposed in the bearing retainer 12. A retaining member is disposed at the axial center of the bearing retainer 12. The bearing 16 is disposed on each axial end of the retaining member.

In the present embodiment, it is assumed that the bearing retainer 12 is integrated with the stator core retainer. Alternatively, the bearing retainer and stator core retainer may be manufactured separately and combined to achieve the above configuration. For example, a cylindrical bearing retainer and a stator core retainer shaped like a hollow disk having a circular inside diameter may be assembled by press-fitting, shrink-fitting, or clearance-fitting to achieve the above configuration.

Lastly, two units of the rotor 3 are fit onto both axial ends of the stator 1 in such a manner as to oppose the stator tooth end 102. First of all, the bearing 16 disposed on the disk 18 of one unit of the rotor 3, to which the shaft 15 is fixed, is fit into the stator bearing retainer 12. Next, another bearing 16 is attached to the opposite side of the bearing retainer 12 to the side which the rotor is attached. Finally, another unit of the rotor 3 is fit onto the shaft 15 of the earlier-fitted rotor, and then fixed by press-fitting, shrink-fitting, or gluing. When this assembling procedure is completed, an axial gap motor having a rotor on both ends is obtained. As the stator core made of an amorphous alloy exhibits high magnetic permeability and low iron loss, a highly efficient motor can be obtained.

Figure 4A:
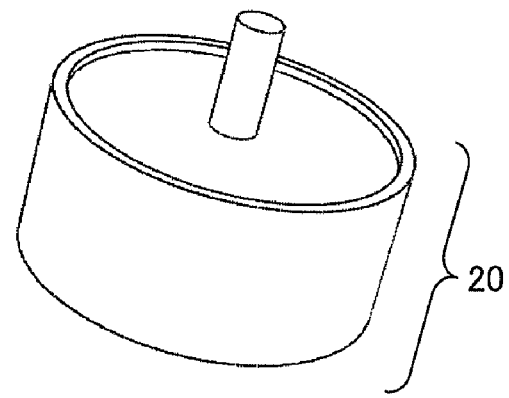
FIG. 4A is an external view of the axial gap motor according to the first embodiment of the present invention.
Figure 4B:
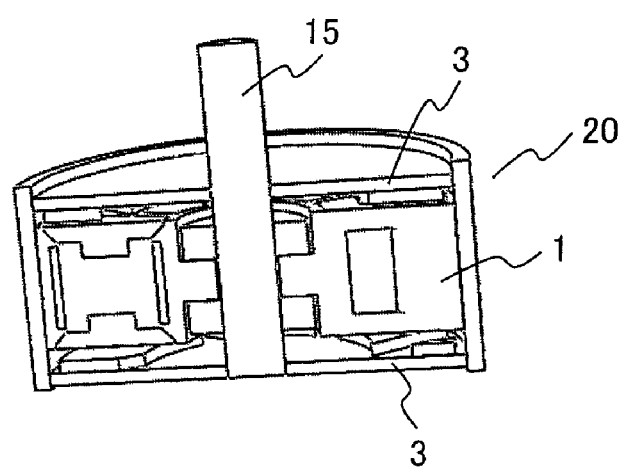
FIG. 4B is a cross-sectional view of the axial gap motor according to the first embodiment of the present invention.

FIG. 4A is an external view of the axial gap motor 20. FIG. 4B is a cross-sectional view of the axial gap motor 20, taken along a plane parallel to the shaft 15. The axial gap motor 20 is similar in appearance to a common radial gap motor because the former is structured so that the shaft 15 coupled to the rotor 3 transmits output to the outside.

Second Embodiment

The axial gap motor according to a second embodiment of the present invention will now be described with reference to FIGS. 5A and 5B.

In the first embodiment, it is assumed that the axial gap motor has a rotor on both ends. More specifically, the first embodiment uses a stator that is obtained by attaching a stator tooth end, which is made of a powder magnetic core compact, to both the upper and lower axial ends of a stator tooth body made of an amorphous foil strip winding. Further, the rotor is disposed on each axial end of the stator. In the second embodiment, it is assumed that the axial gap motor has a rotor on only one axial end of a stator as shown in FIGS. 5A and 5B.

Figure 5A:
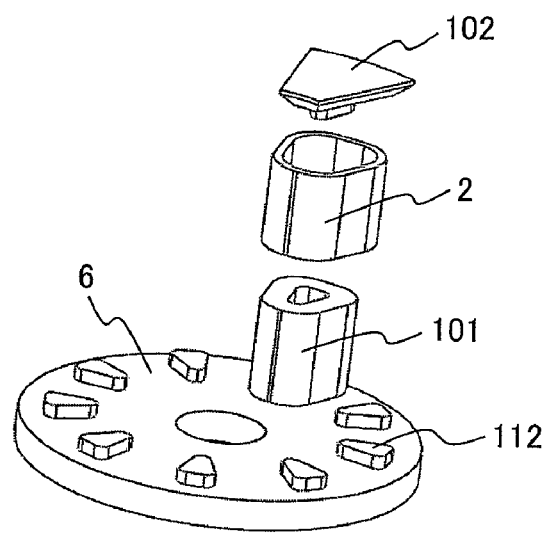
FIG. 5A is a diagram illustrating the structure of the stator of the axial gap motor according to a second embodiment of the present invention.

Referring to FIG. 5A, a stator tooth is combined with a stator yoke (axial gap motor stator yoke) 6. The stator tooth includes the stator tooth body 101, one unit of the stator tooth end 102, and the stator coil 2, which have been described in connection with the first embodiment. The stator tooth body 101 is provided at one axial end with the stator tooth end 102 and at the other axial end with the stator yoke 6.

As is the case with the stator tooth end 102, the stator yoke 6 is formed by a powder magnetic core. Further, the stator yoke 6 includes a protrusion 112, which can be combined with the stator tooth body 101. As shown in FIG. 5A, the protrusion 112 is disposed circumferentially at nine predetermined places.

Figure 5B:
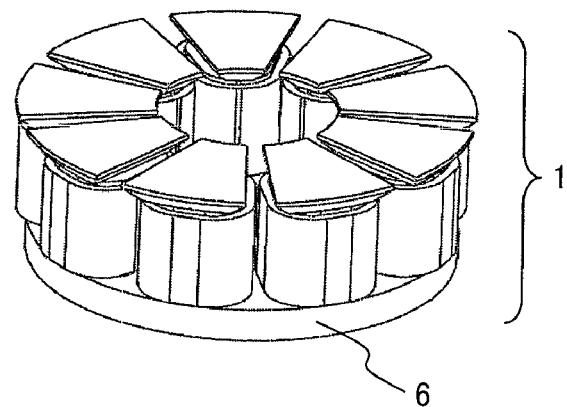
FIG. 5B is a diagram illustrating the stator of the axial gap motor according to the second embodiment of the present invention.

FIG. 5B shows an example in which the stator 1 is configured by combining the stator teeth with the protrusion 112 and disposing the stator teeth circumferentially at nine places of the stator yoke 6. Even when this structure is employed, it is preferred that the stator 1 be fixed with molding resin as shown in FIG. 2A.

Third Embodiment

The axial gap motor according to a third embodiment of the present invention will now be described with reference to FIGS. 6 and 8.

In the foregoing embodiments, it is assumed that the stator core is configured by using a wound amorphous core for the stator tooth body. In the third embodiment, it is assumed that the stator core is configured by using a wound amorphous core for the stator tooth end. As mentioned earlier, the shape of the cross section of the wound amorphous core in a plane perpendicular to the winding axis remains same in any cross section. Therefore, a thin portion of the stator tooth end that has a constant cross-sectional shape in a plane perpendicular to the axial direction is configured by a narrow wound amorphous core, whereas the remaining portion of the stator tooth end (a portion of the stator tooth end that joins to the stator tooth body) and the stator tooth body are formed by a powder magnetic core.

Figure 6A:
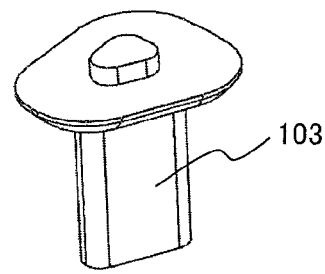
FIG. 6A is a diagram illustrating the structure of a leading-end joint (a stator tooth body and a part of a stator tooth end) of the axial gap motor according to a third embodiment of the present invention.
Figure 6B:
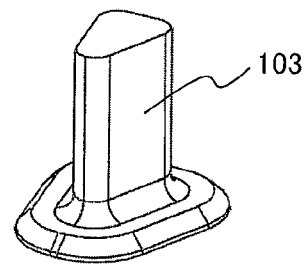
FIG. 6B is an upside-down view of the leading-end joint shown in FIG. 6A.

An example shape of the stator core will now be described with reference to FIGS. 6A to 6C. FIGS. 6A and 6B show a leading-end joint 103. FIG. 6B is an upside-down view of the leading-end joint 103 shown in FIG. 6A. The leading-end joint 103 includes the stator tooth body and a part of the stator tooth end, and is formed by a powder magnetic core. The above-mentioned part of the stator tooth end is a portion of the stator tooth end that joins the stator tooth body. Its cross-sectional shape in a plane perpendicular to the axial direction varies with the position of the cross section. As shown in FIGS. 6A and 6B, the cross-sectional shape in the axial direction of the leading-end joint 103 remains unchanged within the stator tooth body, but gradually enlarges toward the end (a portion on which a wound core 104 is disposed (see FIG. 6C)) in the stator tooth end.

Figure 6C:
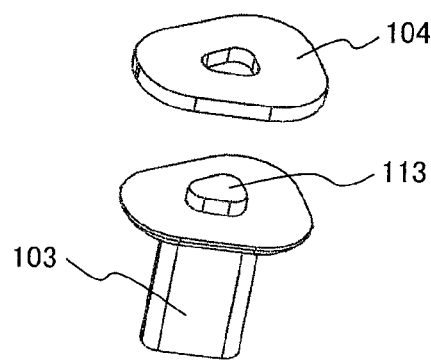
FIG. 6C is a diagram illustrating the structure of a rotor-opposing portion of the stator tooth end of the axial gap motor according to the third embodiment of the present invention.

As shown in FIG. 6C, the wound core 104, which is made of an amorphous alloy, is disposed on a portion of the stator tooth end that opposes a rotor. As described earlier, this portion is thin and its cross-sectional shape in the axial direction is constant. A portion of the leading-end joint 103 on which the wound core 104 is disposed includes a seating surface and a protrusion 113. The protrusion 113 is a mating part for disposing the wound core 104. The protrusion 113 combines the wound core 104, which is shaped as shown in FIG. 6C, with the leading-end joint 103. As described above, a portion of the stator tooth end that includes an opposed surface to the rotor is formed by the wound core 104.

Figure 7A:
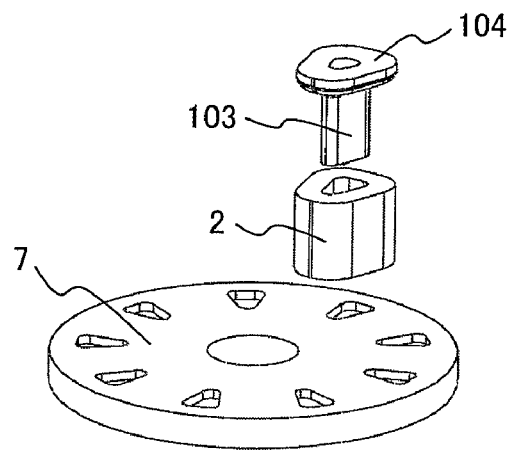
FIG. 7A is a diagram illustrating the structure of the stator of the axial gap motor according to the third embodiment of the present invention.
Figure 7B:
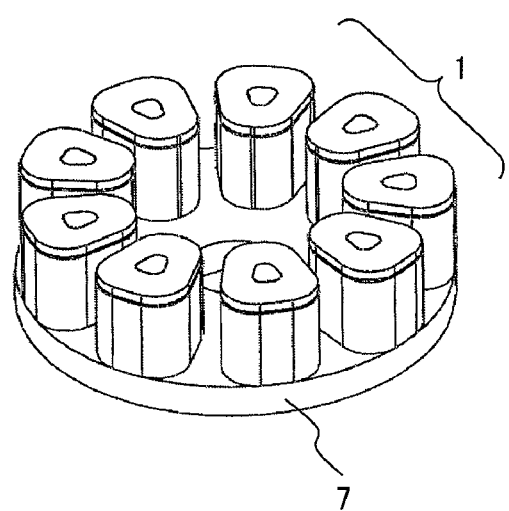
FIG. 7B is a diagram illustrating the stator of the axial gap motor according to the third embodiment of the present invention.

FIGS. 7A and 7B show the shape of the stator. FIG. 7A is a diagram illustrating how the coil 2 and the stator core, which is obtained by combining the wound core 104 with the leading-end joint 103, are attached to a stator yoke 7.

FIG. 7B is a diagram illustrating the stator 1 of the axial gap motor, which is obtained by disposing stator teeth circumferentially at nine places of the stator yoke 7. FIG. 7B indicates that the stator 1 is configured as a stator of an axial gap motor having a rotor on only one axial end as described in connection with the second embodiment.

Figure 8:
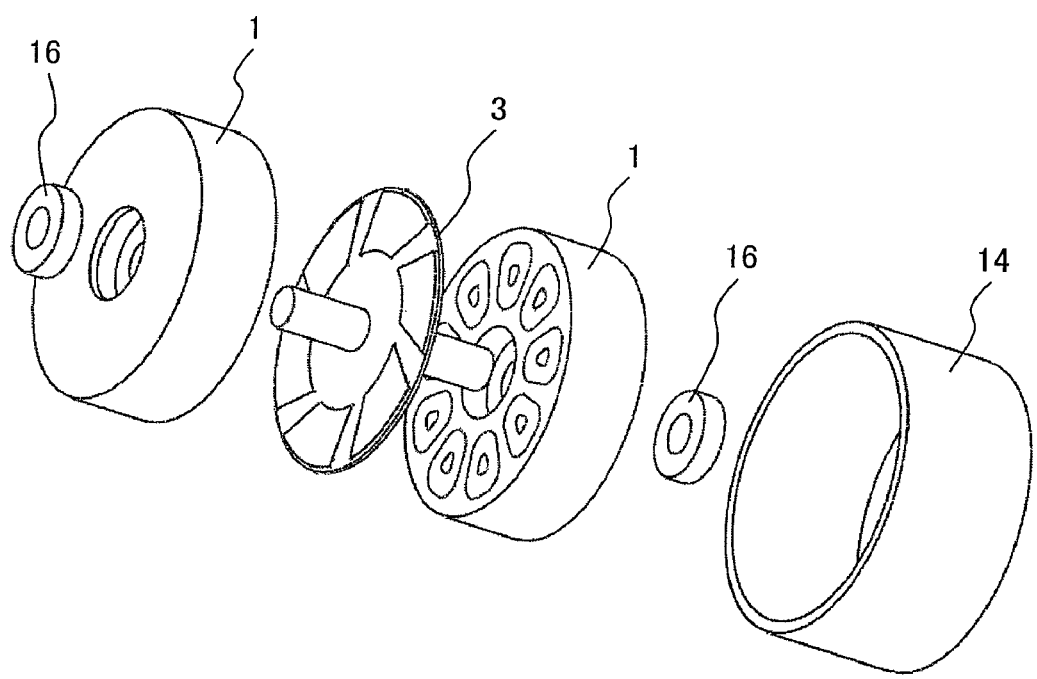
FIG. 8 is a diagram illustrating the structure of the axial gap motor according to the third embodiment of the present invention.

FIG. 8 shows the configuration of an axial gap motor having two units of the stator 1. The axial gap motor according to the present embodiment is configured in such a manner that the stator 1 shown in FIG. 7B is retained and fixed with molding resin and disposed on both axial ends of the disk-shaped rotor 3 having a magnet. A bearing 16 is provided for each unit of the stator 1 and disposed opposite to the rotor 3, and a housing 14 is disposed to surround the two units of the stator 1. When the above-described configuration is employed, the axial gap motor can be configured to generate great output with the amount of magnet minimized.

The above-described configuration can also be applied to the structure according to the second embodiment. Further, the above-described configuration is also applicable to the structure according to the first embodiment in which the rotor is disposed on both axial ends of the stator.

Fourth Embodiment

The axial gap motor according to a fourth embodiment of the present invention will now be described with reference to FIGS. 9A, 9B, and 10.

Figure 9A:
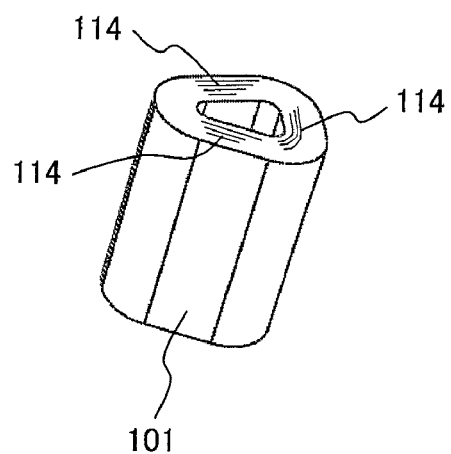
FIG. 9A is a diagram illustrating the multilayer structure of an amorphous foil strip wound core of the axial gap motor according to a fourth embodiment of the present invention.
Figure 9B:
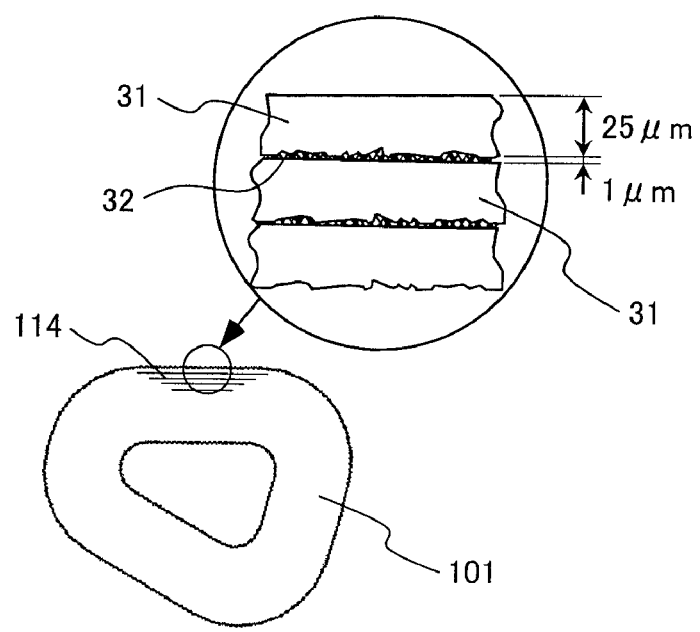
FIG. 9B is a partially enlarged view of the amorphous foil strip wound core of the axial gap motor according to the fourth embodiment of the present invention.
Figure 10:
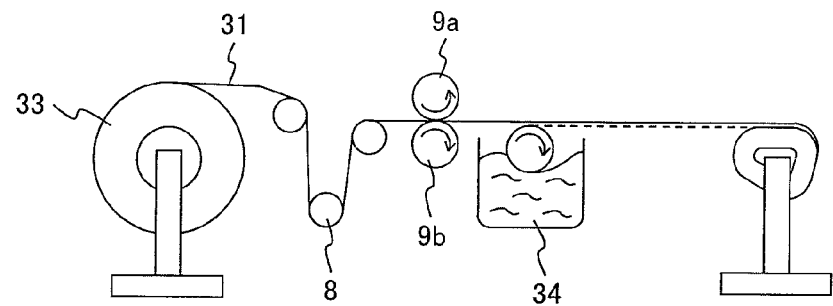
FIG. 10 is a diagram illustrating a method of manufacturing the amorphous foil strip wound core of the axial gap motor according to the fourth embodiment of the present invention.

FIGS. 9A and 9B are diagrams illustrating a stator tooth body 101 that is included in the axial gap motor according to the present embodiment. The stator tooth body 101 includes a wound core that is obtained by winding an amorphous foil strip.

FIG. 9A shows the winding direction 114 of the amorphous foil strip for the stator tooth body 101. The amorphous foil strip is wound in the circumferential direction of the stator tooth body 101 to form a wound multilayered core.

FIG. 9B is an enlarged detail view illustrating a part of a cross section in a plane perpendicular to the axial direction of the stator tooth body 101. As mentioned earlier, one surface of an amorphous alloy, which is supplied in the form of a thin foil, is smooth and the other surface is rough. Referring to FIG. 9B, the cross-sectional view of the stator tooth body 101 indicates that an insulating layer 32, which is made of an insulating adhesive, is disposed between 25 μm thick layers of an amorphous foil strip 31. It is necessary that the insulating layer 32 have a minimum thickness of approximately 1 μm. Further, the insulating layer 32 needs to be configured in such a manner that the layers of the amorphous foil strip 31 are electrically insulated from each other. The reason is that an eddy current would otherwise be generated by magnetic flux.

An example method of manufacturing the above-described wound core will now be described with reference to FIG. 10. The amorphous foil strip 31 is forwarded from the hoop material 33, which supplies an amorphous material, with its position properly decided by rollers, such as a dancer roller 8 and a guide roller. The amorphous foil strip 31 is properly positioned by pressure rollers 9a, 9b and is wound while an insulating adhesive 34 is applied thinly and uniformly to the amorphous foil strip 31 with a dispenser, rod coater, or the like. In this manner, the wound core shown in FIGS. 9A and 9B can be manufactured.

Fifth Embodiment

The axial gap motor according to a fifth embodiment of the present invention will now be described with reference to FIGS. 11A to 11D.

FIGS. 11A to 11D illustrate another method of preparing a core that is obtained by winding an amorphous foil strip. In the present embodiment, a wound core in a roll state is cut to prepare a core having a predetermined form, and the resulting core is used for the stator tooth body.

Figure 11A:
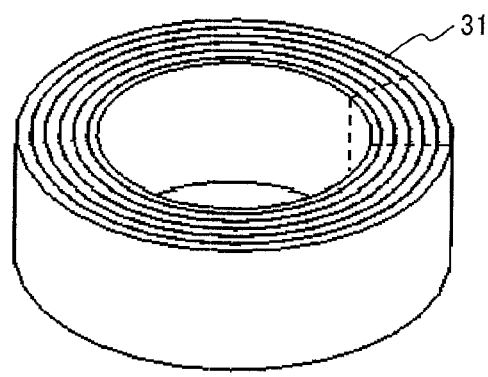
FIG. 11A is a diagram illustrating the amorphous foil strip wound core of the axial gap motor according to a fifth embodiment of the present invention.
Figure 11B:
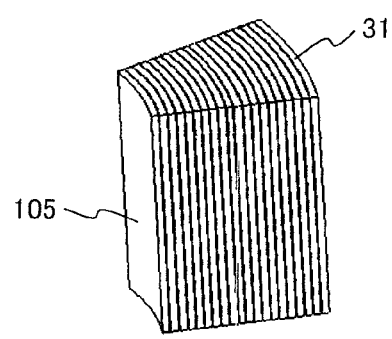
FIG. 11B is a diagram illustrating an iron core that is prepared by cutting the wound core shown in FIG. 11A.

FIG. 11A shows a wound core that is prepared by winding the amorphous foil strip 31 into a roll state. FIG. 11B shows a core 105 which is prepared by cutting the wound core along the dotted lines in FIG. 11A. The core 105 shown in FIG. 11B is shaped substantially in a hexahedron having six faces (flat and curved faces). The core 105 is configured in such a manner that the amorphous foil strip 31 is continuous in the circumferential and axial directions of the wound core and is layered in the radial direction. As an insulating layer is formed between the layers of the amorphous foil strip 31, an eddy current is difficult to flow in the radial direction.

Figure 11C:
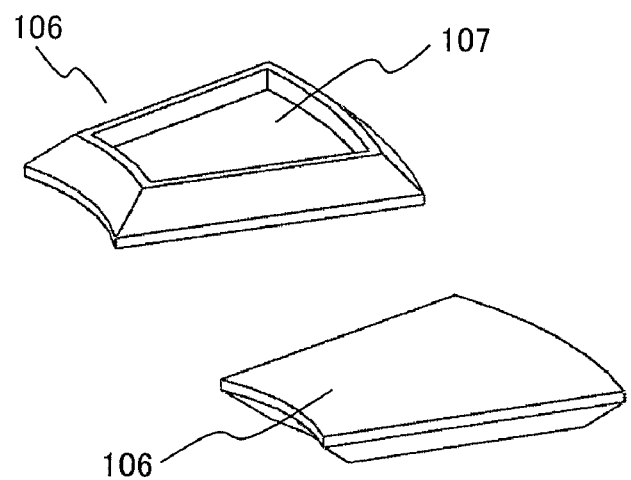
FIG. 11C is a diagram illustrating the shape of the stator tooth end of the axial gap motor according to the fifth embodiment of the present invention.

FIG. 11C shows another example shape of the stator tooth end that is formed by a powder magnetic core compact. This stator tooth end 106 has a dent 107 that can easily retain the core 105 having the structure shown in FIG. 11B. Therefore, the stator tooth end 106 is combined with the core 105. The dent 107 is a mating part for joining the stator tooth end 106 to the amorphous core 105.

Figure 11D:
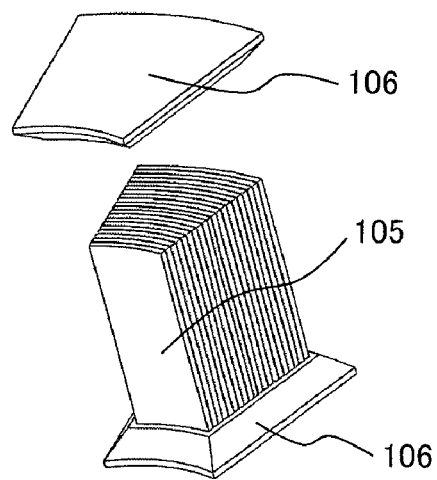
FIG. 11D is a diagram illustrating a stator core of the axial gap motor according to the fifth embodiment of the present invention.

As shown in FIG. 11D, the amorphous core 105 can be fit into the dent 107 in the stator tooth end 106 to prepare a stator core. Even when the stator core prepared in the above-described manner is used, the same advantages are obtained as in the first embodiment.

Sixth Embodiment

Figure 12A:
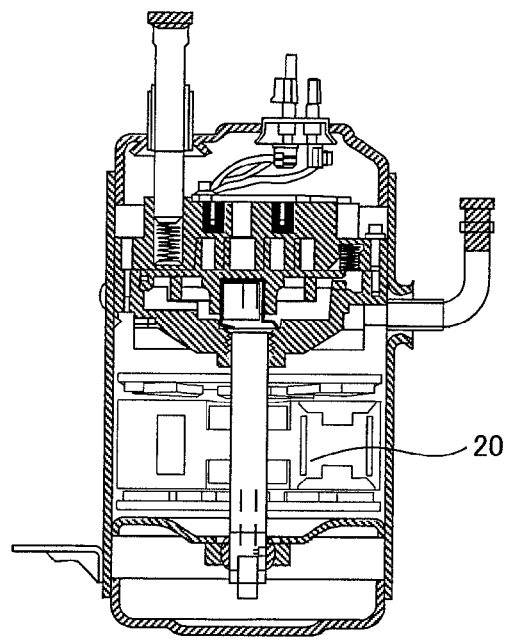
FIG. 12A is a diagram illustrating a compressor for home electrical appliances that includes the axial gap motor according to an embodiment of the present invention.
Figure 12B:
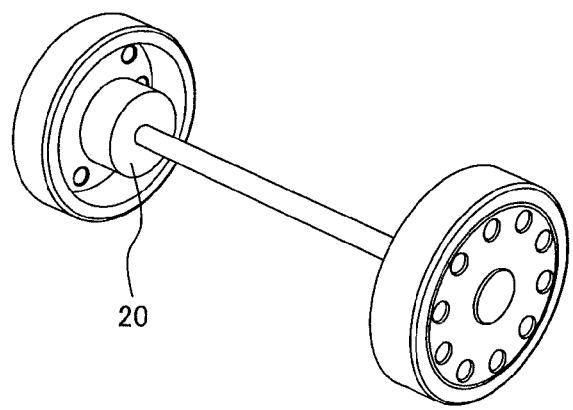
FIG. 12B is a diagram illustrating a motor system for driving an automobile that includes the axial gap motor according to an embodiment of the present invention.
Figure 12C:
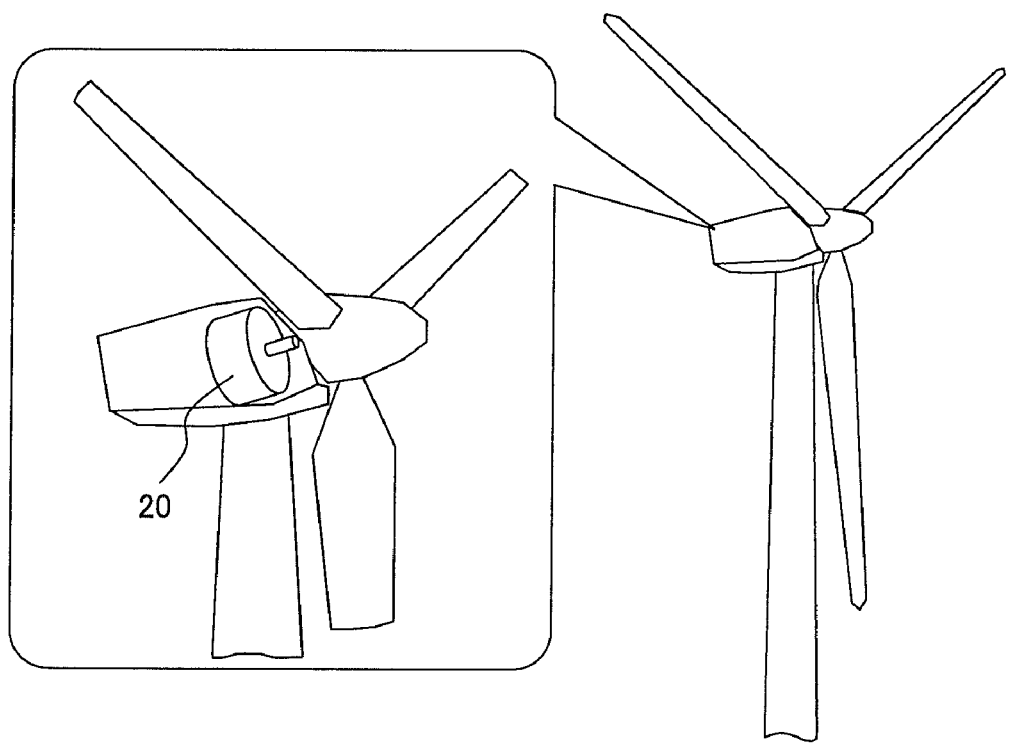
FIG. 12C is a diagram illustrating a power generator for windpower generation that includes the axial gap motor according to an embodiment of the present invention.

FIGS. 12A to 12C show practical applications of the axial gap motor according to an embodiment of the present invention. The axial gap motor is advantageous in that it is flat in shape and capable of generating large torque. When low-iron-loss material, such as an amorphous alloy, and material having good high-frequency characteristics, such as a powder magnetic core, are used for the axial gap motor, a high-efficiency and small-size motor can be implemented. Applications of the axial gap motor described above include a high-efficiency compressor for an air conditioner (shown in FIG. 12A) and other home electrical appliances, a motor system for driving an automobile, such as an in-wheel motor (shown in FIG. 12B), and a flat, high-efficiency power generator for wind power generation (shown in FIG. 12C). The above-mentioned compressor, motor system, and power generator include and use the axial gap motor 20 according to an embodiment of the present invention.

In the foregoing embodiments of the present invention, it is assumed that the structure of the stator for the axial gap motor includes a wound core made of an amorphous alloy. It is expected that the same advantages will be obtained even when the wound core is made of a thin iron sheet (cold-rolled steel sheet or thin electromagnetic steel sheet) or the like.

The use of the axial gap motor according to an embodiment of the present invention makes it possible to obtain high-performance, economical electromagnetic products. Therefore, when the axial gap motor according to an embodiment of the present invention is applied to an electromagnetic product that produces or consumes the greater part of electricity, it significantly reduces carbon dioxide emissions, thereby making it possible to deal with global environmental problems.

The axial gap motor according to an embodiment of the present invention can be applied to a small-size, high-efficiency, and low-noise brushless motor. It can also be widely applied to a general motor system, such as a thin, high-efficiency fan system, a compressor for home electrical appliances, an automotive driving, and a wind power generator.

What is claimed is:

1. An axial gap motor comprising:
a stator including a stator tooth; and
a rotor being opposed to the stator with a gap in the axial direction of the stator;
wherein the stator tooth includes at least two parts, each of the at least two parts made of a material different from another of the at least two parts;
wherein the stator tooth includes: a stator tooth body, a stator tooth end joined to at least one axial-direction end of the stator tooth body, and a stator coil disposed around the stator tooth body;
wherein the stator tooth body is formed by a compact including a powder magnetic core;
wherein the stator tooth end includes a surface opposed to the rotor;
wherein a portion of the stator tooth end including the surface opposed is formed by disposing a wound core comprised of a multi-layered amorphous foil strip winding;
wherein a portion of the stator tooth end joined to the stator tooth body is formed by a compact including a powder magnetic core; and
wherein a cross-sectional area of the stator tooth end perpendicular to an axis of the amorphous foil strip winding is larger than a cross-sectional area of the stator tooth body perpendicular to the axis of the amorphous foil strip winding.

2. The axial gap motor according to claim 1, wherein the portion of the stator tooth end is formed by the compact including the powder magnetic core; and
wherein the cross-sectional area of the portion of the stator tooth end increases in a direction from a protruding mating part, for joining the stator tooth end to the stator tooth body, toward the opposed surface.

3. The axial gap motor according to claim 1, wherein the wound core includes an insulating layer between layers of the amorphous foil strip winding.

4. The axial gap motor according to claim 1, wherein the stator tooth end includes a protruding mating part, for disposing the wound core.

5. The axial gap motor according to claim 1, wherein a joint between the stator tooth end and the stator tooth body has a tapered shape or a fillet shape.

6. The axial gap motor according to claim 1, wherein the stator tooth body, the stator tooth end, and the stator coil are fixed with molding resin.

7. The axial gap motor according to claim 1, wherein the wound core is circular, polygonal, oval, or substantially circular in shape.

8. The axial gap motor according to claim 1, wherein the amorphous foil strip winding is includes an iron-based or cobalt-based amorphous alloy.

9. A compressor for an air conditioner including the axial gap motor according to claim 1.

10. A motor system for driving an automobile including the axial gap motor according to claim 1.

11. A power generator for wind power generation including the axial gap motor according to claim 1.

12. An axial gap motor comprising:
a stator, including a stator tooth, the stator tooth including:
a stator tooth body, the stator tooth body being formed by a compact including a powder magnetic core,
a stator tooth end, joined to at least one axial-direction end of the stator tooth body, the stator tooth end including a surface opposed to the rotor, such that a portion of the stator tooth end including the surface opposed to the rotor is formed by disposing a wound core comprised of a multi-layered amorphous foil strip winding, a portion of the stator tooth end being joined to the stator tooth body, and a stator coil, disposed around the stator tooth body; and a rotor, being opposed to the stator with a gap in the axial direction of the stator;

wherein a cross-sectional area of the stator tooth end perpendicular to an axis of the amorphous foil strip winding is larger than a cross-sectional area of the stator tooth body perpendicular to the axis of the amorphous foil strip winding.

13. The axial gap motor according to claim 12, wherein the wound core is circular, polygonal, oval, or substantially circular in shape.

14. The axial gap motor according to claim 12, wherein the amorphous foil strip winding is includes an iron-based or cobalt-based amorphous alloy.

* * * * *